US012134353B2

(12) United States Patent
Hamming et al.

(10) Patent No.: US 12,134,353 B2
(45) Date of Patent: Nov. 5, 2024

(54) ADJUSTING INSTRUMENT COMPRISING MUTUALLY COOPERATING CAM PATTERNS, IN PARTICULAR FOR ADJUSTING AN EXTERIOR VISION UNIT OF A VEHICLE

(71) Applicant: MCi (Mirror Controls International) Netherlands B.V., Woerden (NL)

(72) Inventors: Peter Alexander Hamming, Ermelo (NL); Teunis Hendrik Heikoop, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 18/031,962

(22) PCT Filed: Oct. 15, 2021

(86) PCT No.: PCT/NL2021/050624
§ 371 (c)(1),
(2) Date: Apr. 14, 2023

(87) PCT Pub. No.: WO2022/081012
PCT Pub. Date: Apr. 21, 2022

(65) Prior Publication Data
US 2023/0391260 A1    Dec. 7, 2023

(30) Foreign Application Priority Data
Oct. 16, 2020   (NL) ...................................... 2026693

(51) Int. Cl.
*B60R 1/22*     (2022.01)

(52) U.S. Cl.
CPC ............ *B60R 1/22* (2022.01); *B60R 2300/20* (2013.01)

(58) Field of Classification Search
CPC . B60R 1/22; B60R 1/076; B60R 11/04; F16C 11/10
(Continued)

(56) References Cited

U.S. PATENT DOCUMENTS 4,623,115 A    11/1986  Brester
6,130,514 A *  10/2000  Oesterholt .............. B60R 1/074
                                                    359/872
(Continued)

FOREIGN PATENT DOCUMENTS

DE        10223460 A1    12/2003
DE     102005049190 A1    4/2007
(Continued)

*Primary Examiner* — Todd M Epps
(74) *Attorney, Agent, or Firm* — Volpe Koenig

(57) ABSTRACT

Adjusting instrument for an exterior vision unit of a vehicle, comprising a base with a foot for attachment to the vehicle, and a frame for carrying the exterior vision unit. The frame is pivotably attached to the base between at least a drive position and a park position via a pair of mutually facing, cooperating cam patterns arranged on the base and the frame, respectively. Each of the two cam patterns comprises cams disposed circumferentially around the pivoting axis in a ring segment, such that cams of the patterns in the drive position engage each other in a rotation-locking manner, and in the pivoting range from and to the drive position adjust over each other. A first cam pattern is provided with a bridge connecting spaced cams in the circumferential direction. The spaced cams form a guiding track on which a guide cam of the second cam pattern is supported.

18 Claims, 4 Drawing Sheets

(58) Field of Classification Search
USPC ................................. 359/872, 871, 841, 838
See application file for complete search history.

(56) References Cited

U.S. PATENT DOCUMENTS

| | | | |
|---|---|---|---|
| 6,390,630 B1 * | 5/2002 | Ochs | B60R 1/074 248/478 |
| 8,544,151 B2 * | 10/2013 | Courbon | E05D 11/1078 16/334 |
| 9,405,090 B2 * | 8/2016 | van Stiphout | G02B 7/1822 |
| 10,232,778 B2 * | 3/2019 | Brouwer | B60R 1/074 |
| 11,247,612 B2 * | 2/2022 | Maat | B60R 1/076 |
| 11,926,262 B2 * | 3/2024 | Hoogenboom | B60R 1/12 |
| 2009/0303625 A1 * | 12/2009 | van Stiphout | B60R 1/074 359/841 |
| 2013/0258510 A1 * | 10/2013 | Sakata | B60R 1/076 359/841 |
| 2019/0085889 A1 | 3/2019 | Sinelli et al. | |
| 2020/0088232 A1 * | 3/2020 | Sinelli | B60R 1/076 |

FOREIGN PATENT DOCUMENTS

| | | |
|---|---|---|
| DE | 202012003399 U1 | 6/2012 |
| EP | 0079677 A1 | 5/1983 |
| EP | 1439980 B1 | 4/2005 |
| EP | 2644452 B1 | 6/2015 |
| JP | 2003011725 A | 1/2003 |
| JP | 3574701 B2 | 10/2004 |
| JP | 2007160948 A | 6/2007 |
| WO | 98/40593 A1 | 9/1998 |
| WO | 2012/047104 A1 | 4/2012 |

\* cited by examiner

ADJUSTING INSTRUMENT COMPRISING MUTUALLY COOPERATING CAM PATTERNS, IN PARTICULAR FOR ADJUSTING AN EXTERIOR VISION UNIT OF A VEHICLE

CROSS REFERENCE TO RELATED APPLICATIONS

This application is a 35 USC § 371 National Stage application of International Patent Application No. PCT/NL2021/050624, which was filed Oct. 15, 2021, entitled "ADJUSTING INSTRUMENT COMPRISING MUTUALLY COOPERATING CAM PATTERNS, IN PARTICULAR FOR ADJUSTING AN EXTERIOR VISION UNIT OF A VEHICLE" and claims priority to Netherlands Patent Application No. 2026693, filed Oct. 16, 2020, which are incorporated herein by reference as if fully set forth.

The invention relates to an adjusting instrument for an exterior vision unit of a vehicle, in particular a motor vehicle, to facilitate the adjustment of the exterior vision unit.

An adjusting instrument for an exterior vision element of a motor vehicle usually comprises a frame, for instance for a housing with an exterior vision unit, such as an exterior mirror, camera, LIDAR and/or display. The frame is usually adjustable relative to a base of the adjusting instrument, which is to be mounted and/or attached to the motor vehicle. In particular, such an adjustment may be done via an electric drive.

The adjusting instrument is often intended to adjust the exterior vision unit between a park position, for instance a folded-in position in which the frame extends at a first angle with respect to a longitudinal axis of the vehicle, for instance substantially along the vehicle, and a work position, for instance a drive position in which the frame extends at a second angle with respect to the longitudinal axis of the vehicle, with the second angle being greater than the first angle, for instance more than circa 20 degrees greater than the first angle, more than circa 30 degrees greater than the first angle, or more than circa 45 degrees greater than the first angle and/or with the frame extending substantially transversely with respect to the vehicle.

An electric drive or actuator for adjusting the frame is usually referred to by the term power fold actuator. A generally known type of adjusting instrument for an exterior vision unit of a (motor) vehicle comprises a base with a foot for attachment to the vehicle, and a frame for carrying the exterior vision unit which may or may not be provided with a housing. The frame is attached to the base in a manner pivotable about a pivoting axis. The frame is typically pivotable in a pivoting range between at least a drive position and a park position of the adjusting instrument, via a pair of mutually facing and mutually cooperating cam patterns which are disposed on the base and the frame, respectively. Each of the two cam patterns usually comprises cams which are disposed in a circumferential direction around the pivoting axis in successive positions in a ring segment, such that cams of the cam patterns engage each other in a rotation-locking manner basically only in the drive position of the adjusting instrument. Typically, the frame is connected with the base via a drive having its own electric motor, so that the pivoting movement by which the frame folds in and out can be carried out in a driven manner.

Upon pivoting of the frame in the pivoting range from and to the drive position, the cams of the cam patterns move relative to each other and slide over each other. In the pivoting range outside the drive position, at least a part of the cams of the cam patterns are supported on each other.

The adjusting instrument is usually implemented with cam patterns that are pressed towards each other under a bias (pre-tension) to counteract, during driving, vibrations and movements of the frame at least in the drive position. For the purpose of, against the bias, moving the cam patterns relative to each other and sliding the cams over each other, often relatively many cams are arranged so that the bias can be efficiently distributed over a relatively large contact surface between the mutually cooperating cam patterns. In particular, due to production tolerances, it cannot be guaranteed that all cams of the cam patterns mutually cooperate with each other effectively, so that it is often desired to arrange more cams than necessary.

Such production tolerances and, for instance, warp of parts of the construction during the life span of the adjusting instrument may cause individual cams to form obstructions in the adjustment range and such that cams sliding over each other can hinder one another upon pivoting of the frame. Such hindering may for instance manifest itself in a jolting adjustment of the frame in the adjustment range and/or be accompanied by unwanted noise, such as rattling and/or ticking noise. For instance upon manual or electric motor driven adjustment, this may be problematic, because the user may undesirably be discouraged from adjusting the adjusting instrument from and/or to a park position or drive position, for instance because of an unstable, vibrating image of the exterior vision unit.

The invention contemplates an adjusting instrument with which a smooth pivoting of the frame in a pivoting range can be obtained, with which, while preserving the advantages mentioned, at least a part of the disadvantages mentioned can be counteracted. In particular, the invention contemplates a construction where in the pivoting range from and to the drive position, obstruction formation by individual cams is counteracted.

To this end, the invention provides an adjusting instrument for an exterior vision unit of a vehicle, comprising a base with a foot for attachment to the vehicle, and a frame for carrying the exterior vision unit, wherein the frame is attached to the base in a manner pivotable about a pivoting axis, in a pivoting range between at least a drive position and a park position of the adjusting instrument, via a pair of mutually facing and mutually cooperating cam patterns which are arranged on the base and the frame, respectively, wherein each of the two cam patterns comprises cams which are disposed in a circumferential direction around the pivoting axis in successive positions in a ring segment, such that cams of the patterns in the drive position of the adjusting instrument engage each other in a rotation-locking manner and in the pivoting range from and to the drive position adjust over each other, wherein a first cam pattern is provided with a bridge which in the circumferential direction mutually connects spaced cams and with the spaced cams forms a guiding track on which a guide cam of the second cam pattern is supported in at least a substantial part of the pivoting range from and to the drive position.

By providing a bridge which in the circumferential direction mutually connects spaced cams and therewith forms a guiding track on which a guide cam can be supported in at least a substantial part of the pivoting range from and to the drive position, an adjusting instrument has been obtained where a smooth pivoting of the frame in the pivoting range is enabled and obstruction formation by individual cams is counteracted.

When the guiding track is largely flat, it can be achieved that the guide cam during at least a part of the pivoting in the pivoting range from and to the drive position is supported on a substantially even and/or level surface and/or adjusts therealong, so that a smooth pivoting of the adjusting instrument is further promoted.

When the bridge extends along at least one cam from the ring segment that is located between two extreme cams connected by the bridge, it can be achieved that the at least one intermediate cam does contribute in the mutual rotation-locking engagement, in the drive position, but does not form or hardly forms an obstruction upon the cams adjusting over each other, in the pivoting range. Alternatively, the bridge does not extend along an intermediate cam. The two extreme cams between which the bridge extends are located in the circumferential direction next to each other then, without a cam therebetween.

When the at least one intermediate cam has a lesser height than the guiding track, it can be achieved that the at least one intermediate cam in at least a substantial part of the pivoting range is located spaced (at a distance) from cams of the second cam pattern. In particular, when the guide cam is supported on the bridge in the pivoting range, this can counteract unevennesses in the at least one intermediate cam, for instance due to production tolerances or due to warp of parts of the construction during the life span, hampering the adjustment of cams over one another in at least a substantial part of the pivoting range. In this way, a smooth adjustment in the pivoting range can be promoted while the contribution of the at least one intermediate cam during at least an initial part of the adjustment from and/or to the drive position can be preserved. In particular, the at least one intermediate cam can contribute to the rotation-locking in the drive position.

When the cams connected by the bridge extend substantially along a radial direction away from the pivoting axis, it can be achieved that a contact surface for the mutually cooperating cam patterns is relatively simply enlarged. By providing the bridge with a ring segment-shaped contour which at the location of a radial part links up with the cams connected by the bridge, the bridge can be elegantly incorporated in the ring segment.

When the radial part of the cams which the ring segment-shaped contour links up with is a radial end proximal to the pivoting axis, a radial end remote from the pivoting axis or a radial intermediate part, located between the radial ends, of the cams connected by the bridge, the stability of the construction can be improved. In particular, an operational stability of the construction during pivoting can be augmented. That is to say, the ring segment-shaped contour can, in the radial direction, form a stop for other cams of the second cam pattern and thereby counteract a radial movement of the respective cam patterns relative to each other.

By providing the first cam pattern with a plurality of bridges connecting spaced cams in the circumferential direction, the mutual cooperation between the cam patterns, in particular the guide cam and the guiding track, can be divided in circumferential direction over a plurality of segments. In this way, the operational stability during pivoting can be ensured, in particular when the first cam pattern is provided with two, three or four bridges which are in circumferential direction evenly distributed over the first cam pattern.

When the guide cam of the second cam pattern has a greater height than other cams of the second cam pattern, it can be achieved that in at least a substantial part of the pivoting range from and to the drive position the other cams are spaced (are at a distance) from the first cam pattern. In particular, other cams of the second cam pattern can contribute to rotation-locking in the drive position and/or to adjustment during at least an initial part of the pivoting range from and to the drive position.

When other cams of the second cam pattern, that is, cams other than the guide cam, comprise an interruption corresponding to the bridge for receiving the bridge upon mutual rotation-locking engagement with the cams of the first cam pattern in the drive position, this can counteract the cams and the ring segment-shaped contour being in each other's way. This can facilitate the cams of the mutually cooperating cam patterns engaging each other in a rotation-locking manner in the drive position of the adjusting instrument.

Advantageously, one of the first and second cam pattern may be provided on the base and the other of the first and second cam pattern may be provided on the frame. In particular, the cam pattern corresponding with the base and/or the frame may be formed integrally therewith. In this manner, the respective cam pattern with the base and/or frame can be fabricated relatively simply by means of an injection molding or sintering process.

By providing the cams of the first cam pattern connected via the bridge and the guide cam of the second cam pattern with run-on surfaces for moving the base and the frame mutually away from each other axially along the pivoting axis upon pivoting of the adjusting instrument from the drive position, it can be achieved that the guide cam of the second cam pattern comes to be supported on the guiding track of the bridge. Conversely, the run-on surfaces can also facilitate the base and the frame mutually moving towards each other axially along the pivoting axis upon pivoting of the adjusting instrument towards the drive position. In this manner, the run-on surfaces can promote a gradual axial movement between the base and the frame upon pivoting from and to the drive position.

By providing each of the two cam patterns with a plurality of ring segments distributed in the circumferential direction having cams disposed in the circumferential direction in successive positions, wherein between the ring segments of the first cam pattern recesses are formed for, in the drive position of the adjusting instrument, receiving corresponding guide cams of the second cam pattern, the stability of the construction in the drive position can be improved in a relatively simple manner by providing the cam patterns with a plurality of rotation-locking engagement points distributed in circumferential direction. Preferably, each of the two patterns comprises two, three or four ring segments distributed in circumferential direction. In this way, respectively, two, three or four rotation-locking engagement points can be provided, while a relatively large pivoting range can be ensured, as, for example, of respectively about 180°, 120° and 90°.

When the base and the frame are pressed towards each other under a bias (pre-tension), vibrations caused during driving due to unevennesses in a road surface can be counteracted in the adjusting instrument.

The invention will be further elucidated on the basis of an exemplary embodiment of an adjusting instrument which is shown in drawings. In the drawings.

Figure 1:
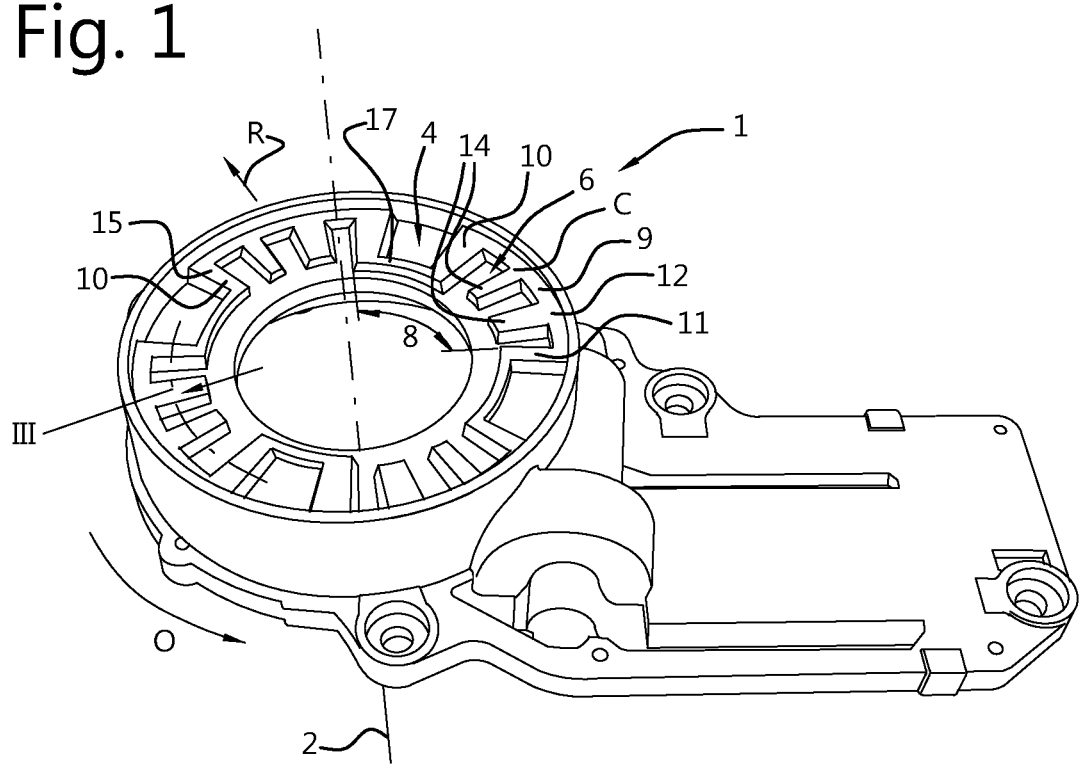
FIG. 1 is a schematic perspective view of a part, in particular a frame, of an adjusting instrument according to the invention.

It is noted that the figures are only schematic representations of preferred embodiments of the invention, and that these are given by way of non-limiting exemplary embodiments. In the exemplary embodiments, in respect of the different embodiments, equal or corresponding parts are represented with the same reference numerals.

Figure 2:
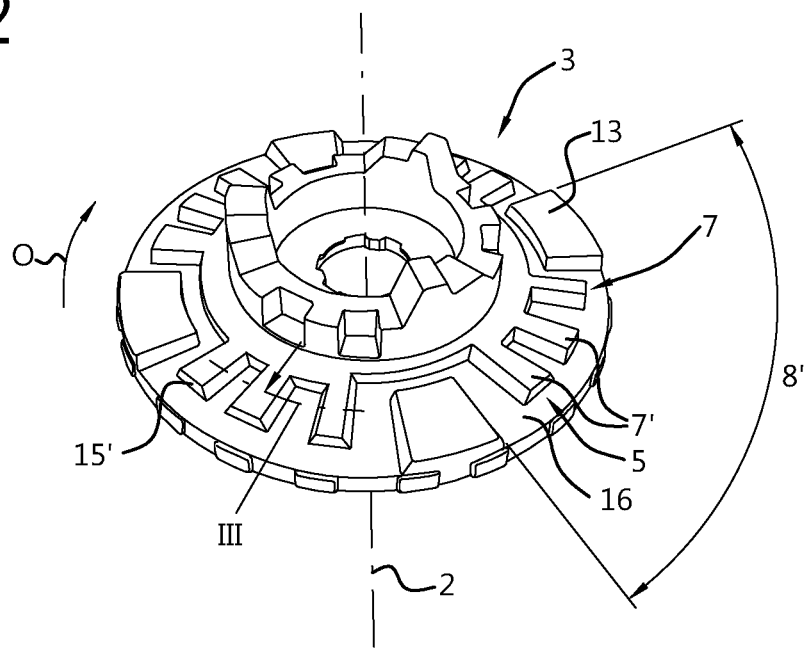
FIG. 2 is a schematic perspective view of a part, in particular a base, of an adjusting instrument according to the invention.

FIG. 1 and FIG. 2 show parts, in particular a frame 1 and a base 3 respectively, of an adjusting instrument, not shown, for an exterior vision unit of a vehicle. The frame 1 is configured for carrying the exterior vision unit, not shown, which may or may not comprise a housing. The frame 1 is further configured to be attached to the base 3 of the adjusting instrument in a manner pivotable around a pivoting axis 2. The base 3 of the adjusting instrument is often attached via a foot not shown to an outer part of the body of the (motor) vehicle. In mounted condition, the pivoting axis 2 typically extends along a base shaft (not shown) extending substantially upright with respect to the fixed world. Alternatively, the pivoting axis 2 can also extend at an angle to the base shaft extending substantially upright with respect to the fixed world. Typically, the frame 1 is connected with the base 3 via (not shown) a drive with an electric motor in or at the frame 1, or in or at the base 3, so that the pivoting movement with which the frame folds in and folds out can be performed in a driven manner.

The adjusting instrument is intended to adjust the exterior vision unit between a park position, for instance a folded-in position in which the frame 1 extends substantially along the vehicle, and a work position, for instance a drive position in which the frame 1 extends substantially transversely to the vehicle. To that end, the frame 1 is attached to the base 3 in a manner pivotable around the pivoting axis 2, in a pivoting range between at least the drive position and the park position of the adjusting instrument.

In the exemplary embodiment shown, a first cam pattern 4 of a pair of mutually facing and mutually cooperating cam patterns 4, 5 is integrally formed with the frame 1 (FIG. 1). Referring to FIG. 2, the base 3 comprises the second cam pattern 5. Conversely, the first 4 and second cam pattern 5, of course, may also be provided on the base 3 and the frame 1, respectively. The first cam pattern 4, for instance, may also be implemented separately and be provided on the frame 1. The first 4 and second cam pattern 5 are respectively provided with cams 6, 7. The cams 6, 7 are disposed in a circumferential direction O around the pivoting axis 2 in successive positions in a ring segment 8, 8'. In this exemplary embodiment, four cams 6 are disposed in the ring segment 8 of the first cam pattern 4. In the ring segment 8' of the second cam pattern 5, four cams 7 are disposed, one of the four cams 7 forming a guide cam 13, besides three other cams 7'. It will be clear to one skilled in the art that variations in the number of cams are possible, such as, for instance, where the first cam pattern 4 comprises two, three, five, or more cams 6 disposed in the ring segment 8 and/or where the second cam pattern 5 comprises one, two, three, five, or more cams 7 disposed in the respective ring segment 8'. Each of the two cam patterns 4, 5 comprises four ring segments 8, 8' distributed in circumferential direction O with cams 6, 7 disposed in the circumferential direction O in successive positions. It will be clear to one skilled in the art that two or three ring segments are also possible. The second cam pattern 5 comprises four guide cams 13a-d which are substantially proportionally distributed in the circumferential direction O. The guide cams 13 are formed as pairs of guide cams 13a,b; 13c,d, see for example FIG. 5. Each pair has two guide cams 13a,b; 13c,d which are located substantially opposite each other. The guide cams of each pair have a substantially equal geometry. However, the geometry of guide cams may vary per pair. In the embodiment shown, a first pair of guide cams 13a,b have a geometry with relatively large dimensions in the circumferential direction, while a second pair of guide cams 13c,d have a geometry with relatively small dimensions in the circumferential direction O. The second pair of guide cams 13c,d are, viewed in the circumferential direction, shorter than the first pair of guide cams 13a,b.

The cams 10, 11 of the first cam pattern, at the ends of the guiding track 12, may extend radially farther or less far towards the pivoting axis 2 than the intermediate cams 14. Thus, one of the two cams 10, 11 or each of the two cams 10, 11 may extend radially farther inwards or, conversely, less far radially inwards. Also, the first cam pattern 4 has connecting ribs 17, each extending in circumferential direction O between radially inwardly located ends of adjacent cams 10, 11 which form ends of successive guiding tracks 12. Put differently, a cam 10 at an end of a first guiding track 12 is connected to an adjacent cam 11 which forms an end of an adjacent track 12. The connection is realized by a connecting rib 17 which forms a continuous ring segment from and up to the two adjacent cams 10, 11 at the radially inwardly located ends thereof. The cams 6, 7 of cam patterns 4, 5 are so disposed that they engage each other in a rotation-locking manner only in the drive position of the adjusting instrument. The distance in circumferential direction O between successive cams 6, 7 may be equal in each case or vary slightly. Further, the cams 6, 7 are so configured as to be adjustable over each other in the pivoting range from and to the drive position. Each cam 6, 7 comprises to that end a top and two obliquely rising flanks. The obliquely rising flanks of the cams 6, 7 are correspondingly shaped so that they can cooperate mutually. In consequence, at an initial part of the pivoting range from and to the drive position, at least a part of the cams 6, 7 can cooperate via the obliquely rising flanks to move the frame 1 and the base 3 axially apart and towards each other, respectively.

Further, the first cam pattern 4 is provided with a bridge 9. The bridge 9 connects spaced apart cams 10, 11 in the circumferential direction O. Referring to the first cam pattern 4 of FIG. 1, the first cam 10 and the last cam 11 of the ring segment 8 are connected with each other by the bridge 9. It will be clear to one skilled in the art that many permutations are possible, for example, the first cam 10 and the second or third cam of the cams 6 in the ring segment 8 could be connected with each other by the bridge 9. The bridge 9 forms with the spaced cams 10, 11 a guiding track 12. The guiding track 12 is largely flat, and may for instance also comprise a run-on and/or run-off track segment, substantially at and/or near ends of the bridge 9 for promoting a smooth adjustment of the adjusting instrument.

Figure 3:
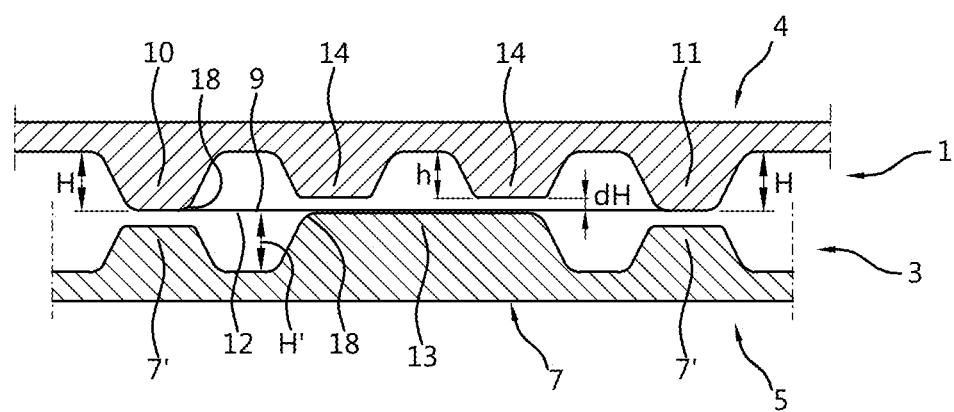
FIG. 3 is a schematic partial view of a cross section in a circumferential direction along line III-III in FIG. 1 and FIG. 2 of a pair of cam patterns facing each other in a pivoting range, which are arranged on respectively the base of FIG. 2 and the frame of FIG. 1.

FIG. 3 shows a schematic partial view of a cross section in the circumferential direction O along line III-III in FIG. 1 and FIG. 2 of the pair of cam patterns 4, 5 facing each other in the pivoting range, which are arranged on the frame 1 and the base 3, respectively. FIG. 3 shows the view from the pivoting axis 2. The line III-III extends along a segment of a circle in the circumferential direction O. As shown in FIG. 3, the guide cam 13 of the second cam pattern 5 is, in at least a substantial part of the pivoting range from and to the drive position, supported on the guiding track 12 formed by the bridge 9 with the two spaced cams 10, 11. Advantageously, the bridge 9 and the cams 10, 11 connected thereby have substantially the same height H axially along the pivoting axis 2, so that the guiding track 12 is largely flat. The bridge 9 extends along two cams 14 from the ring segment 8 which are located between the two extreme cams 10, 11 connected by the bridge 9. The two intermediate cams 14 have axially along the pivoting axis 2 a lesser height h than the guiding track 12. A difference in height dH between the guiding track 12 and the intermediate cams 14 may be between e.g. circa 0.2-1.5 mm, as e.g. circa 0.3-0.5, or 0.5-0.8 mm. The guide cam 13 of the second cam pattern 5 has axially along the pivoting axis 2 a greater height H' than the other cams T of the second cam pattern 5.

Figure 4:
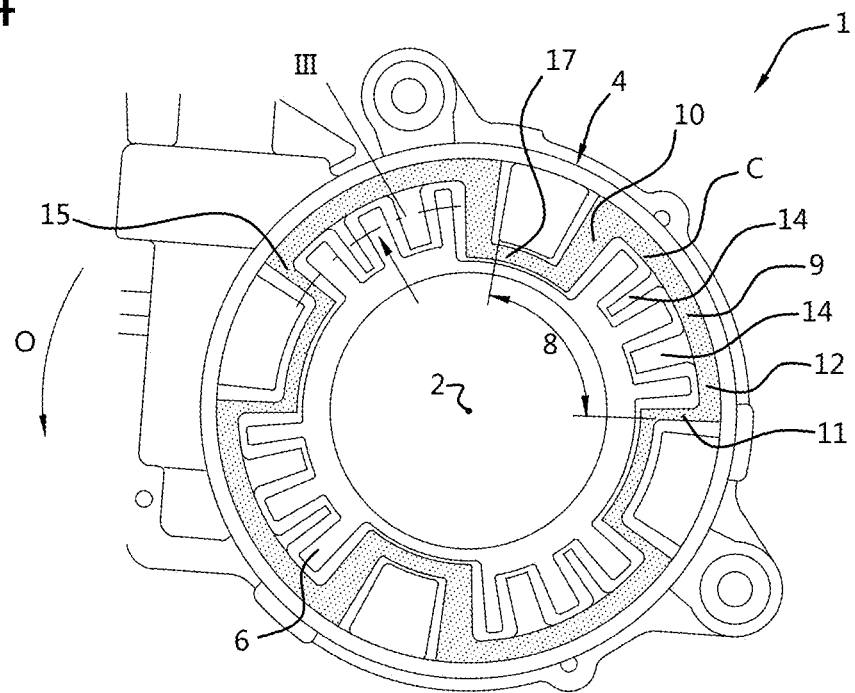
FIG. 4 is a schematic bottom view of the part shown in FIG. 1.

FIG. 4 shows a schematic bottom view of the part, in particular the frame 1, shown in FIG. 1.

Figure 5:
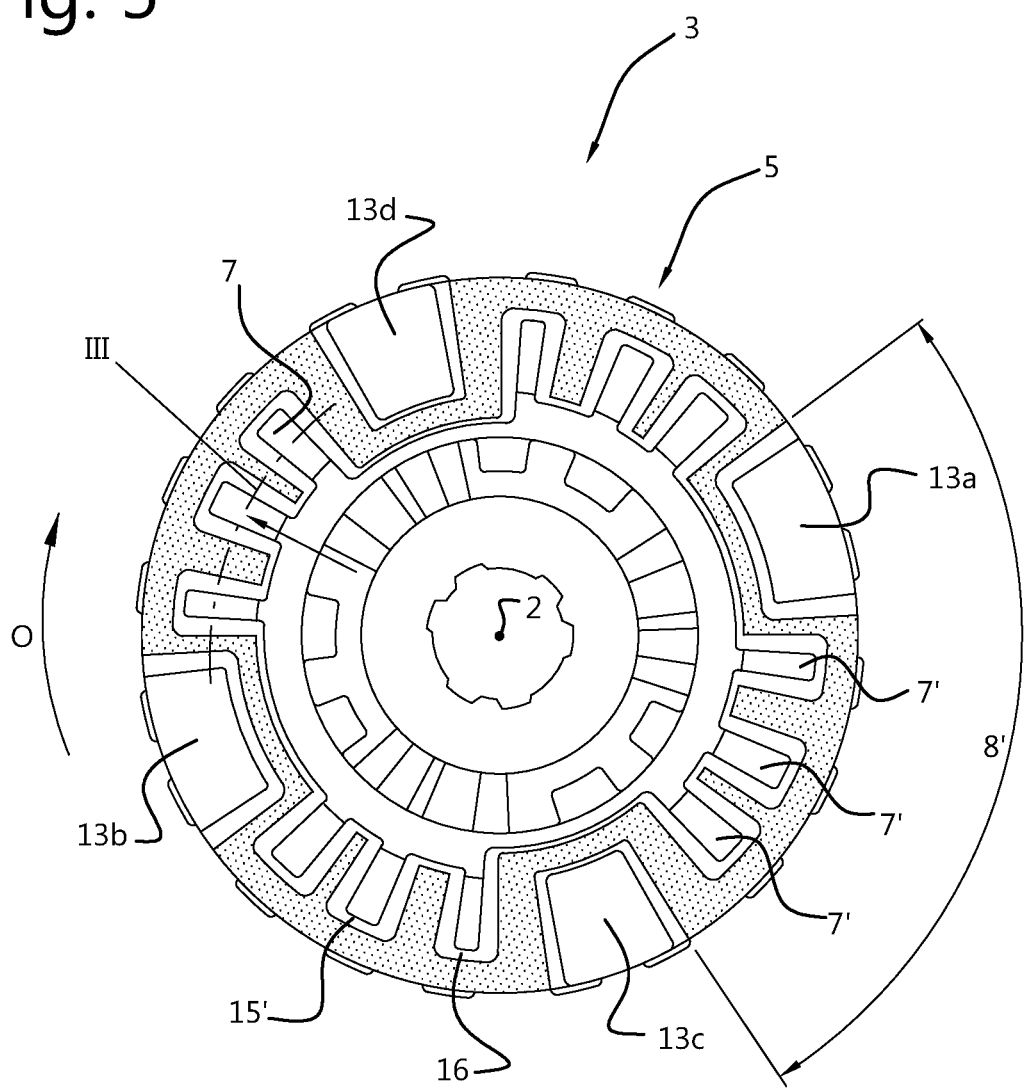
FIG. 5 is a schematic top plan view of the part shown in FIG. 2.

FIG. 5 shows a schematic top plan view of the part, in particular the base 3, shown in FIG. 2.

Referring to FIGS. 1 and 2, and FIGS. 3 and 4, respectively, there is shown that the cams 10, 11 connected by the bridge 9 extend substantially along a radial direction R away from the pivoting axis 2. The bridge 9 comprises a ring segment-shaped contour C which links up with a radial end 15 remote from the pivoting axis 2 of the cams 10, 11 connected by the bridge 9. The two extreme cams 10, 11 connected by the bridge 9 may extend radially towards the pivoting axis 2, or away from it, farther than intermediate cams 14. In the exemplary embodiment shown, the bridge 9 forms a dam with a ring segment-shaped contour C, and the cams 10, 11 connected by the bridge 9 and the intermediate cams 14 extend radially equally far. Additionally or alternatively, the ring segment-shaped contour C may link up with a radial end proximal to the pivoting axis 2 of the cams 10, 11 connected by the bridge 9. It is also possible, of course, to provide the ring segment-shaped contour C on a radial intermediate part, located between the radial ends 15, of the cams 10, 11 connected by the bridge 9. Also, the first cam pattern 4 may be provided with a plurality of bridges 9 connecting spaced cams 10, 11 in the circumferential direction O, such as, for instance, bridges located at least partly radially next to each other and/or on different radial parts of ring segments of the cams 7.

In FIG. 2 and FIG. 4 it is shown that the other cams 7' of the second cam pattern 5 comprise an interruption 16 corresponding to the bridge 9 for receiving the bridge 9 upon mutual rotation-locking engagement of the cams in the drive position. The interruption 16 is here implemented at a radial end 15' of the other cams 7'. That is to say, the other cams 7' extend radially away from the pivoting axis 2 less far than the guide cams 13. The interruption may also be implemented as a recess centrally in the cams T, for instance when the bridge 9 is disposed centrally between the radial ends 15 in the first cam pattern 4.

In mounted position of the adjusting instrument, the guide cam 13 is supported on the guiding track 12 in at least a substantial part of the pivoting range from and to the drive position. In the context of this disclosure, substantial part of the pivoting range from and to the drive position should be understood to mean the whole pivoting range, or a part thereof, outside the initial pivoting in which for instance at least a part of the obliquely rising flanks of cams 6, 7 cooperate to move the cams 6, 7 apart or towards each other axially along the pivoting axis 2.

The cams 10, 11, connected via the bridge 9, of the first cam pattern 4 and the guide cam 13 of the second cam pattern 5 are provided with run-on surfaces 18 for moving the base 3 and the frame 1 mutually further away from each other axially along the pivoting axis 2 upon pivoting of the adjusting instrument from the drive position. The run-on surfaces 18 are provided on top of the flanks of cams 6, 7 to facilitate a last part of the initial pivoting in the adjustment range from and/or to the drive position, in other words, for effecting a last push for the guide cam 13 from and/or to the guiding track 12 of the first cam pattern 4. The run-on surfaces 18 are disposed in line with the flanks of the cams 10, 11, connected via the bridge 9, of the first cam pattern 4 and the guide cam 13 of the second cam pattern 5.

The cooperating cam patterns 4, 5 of the frame 1 and the base 3, respectively, are, in the work position, under a bias urging them towards each other, as for instance under a spring load urging them towards each other. This may be done, for instance, by means of a helical spring or compression spring, not shown, arranged around the pivoting axis 2. This bias, in particular spring load, may be removed before the frame pivots electrically from the work position relative to the base. This may for instance be implemented in that the drive makes an internal stroke, as a result of which the spring force is transferred from the frame to the base.

Figure 6:
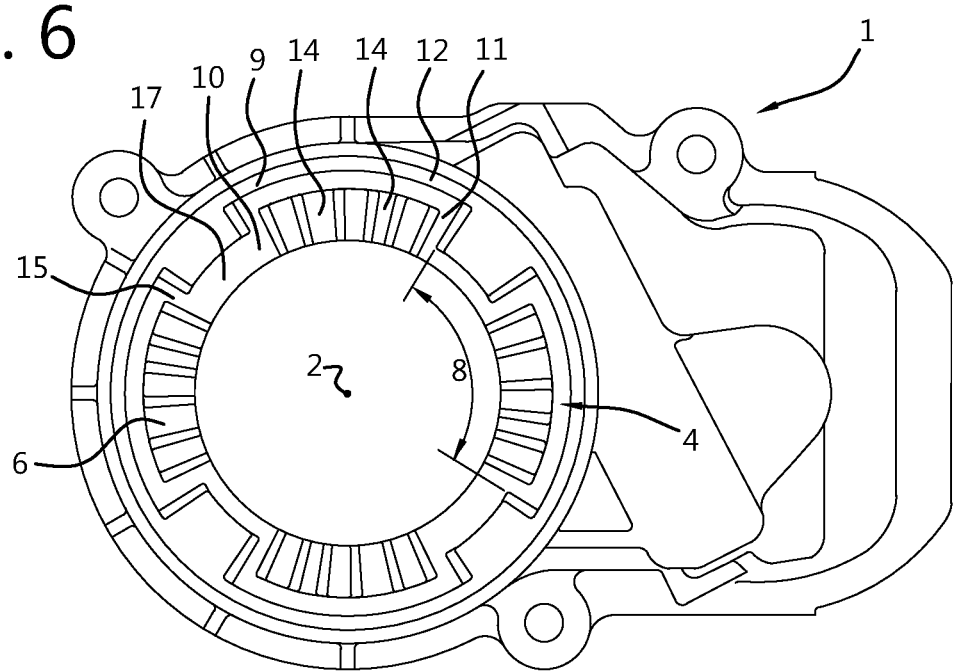
FIG. 6 is a schematic perspective view of a part, in particular a frame, of another adjusting instrument according to the invention.

Further, FIG. 6 shows a schematic bottom view of a part, in particular a frame, of another adjusting instrument according to the invention.

Figure 7:
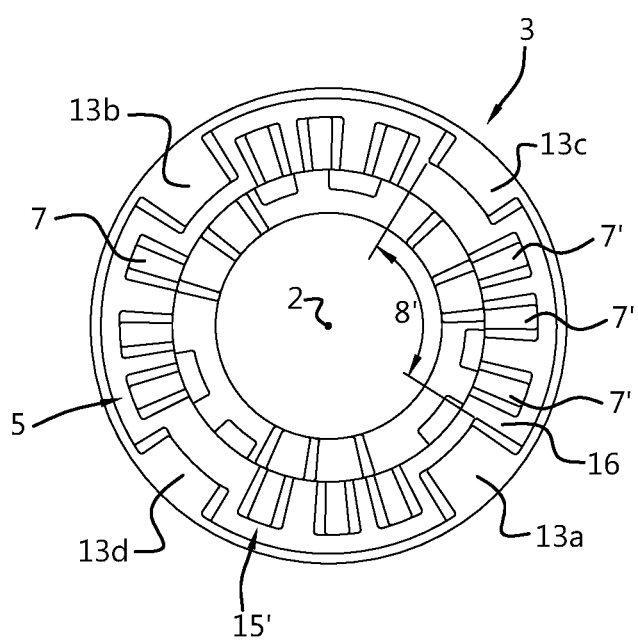
FIG. 7 is a schematic perspective view of a part, in particular a base, of another adjusting instrument according to the invention.

FIG. 7 shows a schematic top plan view of a part, in particular a base, of another adjusting instrument according to the invention. Like the parts shown in FIGS. 1-5, the frame 1 as shown in FIG. 6 is configured to be attached in a manner pivotable around a pivoting axis 2 to the base 3 as shown in FIG. 7.

As is the case with the base 3 in FIG. 2, the guide cams 13 of the base in FIG. 7 are formed as pairs of guide cams 13a,b; 13c,d. Each pair has two guide cams 13a,b; 13c,d which are located substantially opposite each other. The guide cams of each pair have a substantially equal geometry. However, the geometry of guide cams may vary per pair. In the embodiment shown in FIG. 7, a first pair of guide cams 13a,b have a geometry where the cams extend radially inwards relatively far, while a second pair of guide cams 13c,d have a geometry where the radially inward dimension of the cams is relatively short. The guide cams 13c,d of the second pair extend radially inwards less far than the guide cams 13a,b of the first pair.

It is noted that the invention is not limited to the exemplary embodiments described here. The cam patterns can for instance be regular cam patterns, but can also comprise a multicam configuration, where the cams are disposed in the ring segment with a variable interspace. In a regular cam pattern, cams are disposed in a ring segment with an equal interspace. The adjusting instrument may for instance be provided with many other functions, such as a stop which, during manual adjustment from the work position both in the direction of the park position and in the direction of the overfold position, forms a physical or auditory stop which is not present during electric adjustment at least in the direction of the park position. Such a function is known as 'double detent'. The frame may, to that end, be provided with a clutch ring, and the base may, to that end, be provided with a cam ring. Such functions of adjusting devices are known per se, and are for instance described in e.g. WO 2005/075249, WO 2012/047104 and WO2017/074193. Such variants will be clear to one skilled in the art and are understood to be within the scope of the invention, as defined in the appended claims.

LIST OF REFERENCE SIGNS

1. Frame
2. Pivoting axis
3. Base
4. First cam pattern of pair
5. Second cam pattern of pair
6. Cams of the first cam pattern
7. Cams of the second cam pattern
7'. Other cam
8. Ring segment of the first cam pattern
8'. Ring segment of the second cam pattern
9. Bridge
10., 11. Cams spaced from each other (connected by bridge)
12. Guiding track
13. Guide cam
14. Intermediate cam
15. Radial end of cam
15'. Radial end of other cam
16. Interruption
17. Connecting Ribs
18. Run-on surface
H. Height of bridge and cams connected thereby
h. Height of intermediate cam
dH. Difference in height
H'. Height of guide cam
C. Ring segment-shaped contour

The invention claimed is:

1. An adjusting instrument for an exterior vision unit of a vehicle, comprising a base with a foot for attachment to the vehicle, and a frame for carrying the exterior vision unit, wherein the frame is attached to the base in a manner pivotable about a pivoting axis, in a pivoting range between at least a drive position and a park position of the adjusting instrument, via a pair of mutually facing and mutually cooperating cam patterns which are arranged on the base and the frame, respectively, wherein each of the two cam patterns comprises cams which are disposed in a circumferential direction around the pivoting axis in successive positions in a ring segment, such that cams of the patterns in the drive position of the adjusting instrument engage each other in a rotation-locking manner and in the pivoting range from and to the drive position adjust over each other, wherein a first cam pattern is provided with a bridge which in the circumferential direction mutually connects spaced cams and with the spaced cams forms a guiding track on which a guide cam of the second cam pattern is supported in at least a substantial part of the pivoting range from and to the drive position.

2. The adjusting instrument according to claim 1, wherein the guiding track is largely flat.

3. The adjusting instrument according to claim 1, wherein the bridge extends along at least one cam from the ring segment that is located between two extreme cams connected by the bridge.

4. The adjusting instrument according to claim 3, wherein the at least one intermediate cam has a lesser height than the guiding track.

5. The adjusting instrument according to claim 1, wherein the cams connected by the bridge extend substantially along a radial direction away from the pivoting axis, and wherein the bridge comprises a ring segment-shaped contour which at the location of a radial part links up with the cams connected by the bridge.

6. The adjusting instrument according to claim 5, wherein the radial part of the cams which the ring segment-shaped contour links up with is a radial end proximal to the pivoting axis, a radial end remote from the pivoting axis or a radial intermediate part, located between the radial ends, of the cams connected by the bridge.

7. The adjusting instrument according to claim 5, wherein two extreme cams connected by the bridge extend radially farther than intermediate cams.

8. The adjusting instrument according to claim 1, wherein the first cam pattern is provided with a plurality of bridges connecting spaced cams in the circumferential direction.

9. The adjusting instrument according to claim 1, wherein the guide cam of the second cam pattern has a greater height than other cams of the second cam pattern.

10. The adjusting instrument according to claim 1, wherein other cams of the second cam pattern comprise an interruption corresponding to the bridge, for receiving the bridge upon mutual rotation-locking engagement with the cams of the first cam pattern in the drive position.

11. The adjusting instrument according to claim 1, wherein one of the first and second cam pattern is provided on the base and wherein the other of the first and second cam pattern is provided on the frame.

12. The adjusting instrument according to claim 1, wherein the cams connected via the bridge of the first cam pattern and the guide cam of the second cam pattern are provided with run-on surfaces for moving the base and the frame mutually away from each other axially along the pivoting axis upon pivoting of the adjusting instrument from the drive position.

13. The adjusting instrument according to claim 1, wherein each of the two cam patterns is provided with a plurality of ring segments distributed in the circumferential direction with cams disposed in the circumferential direction in successive positions, wherein between the ring segments of the first cam pattern recesses are included for, in the drive position of the adjusting instrument, receiving corresponding guide cams of the second cam pattern.

14. The adjusting instrument according to claim 1, wherein the second cam pattern has pairs of guide cams whose geometry varies per pair.

15. The adjusting instrument according to claim 14, wherein guide cams of a first pair extend farther radially inwards and/or farther in circumferential direction than guide cams of a second pair.

16. The adjusting instrument according to claim 1, wherein the first cam pattern has a connecting rib which extends in circumferential direction between adjacent cams which form ends of successive guiding tracks.

17. The adjusting instrument according to claim 1, wherein the base and the frame are pressed towards each other under a bias.

18. The adjusting instrument according to claim 1, wherein the cam pattern corresponding with the base and/or the frame is formed integrally therewith.

* * * * *